Patented June 3, 1941

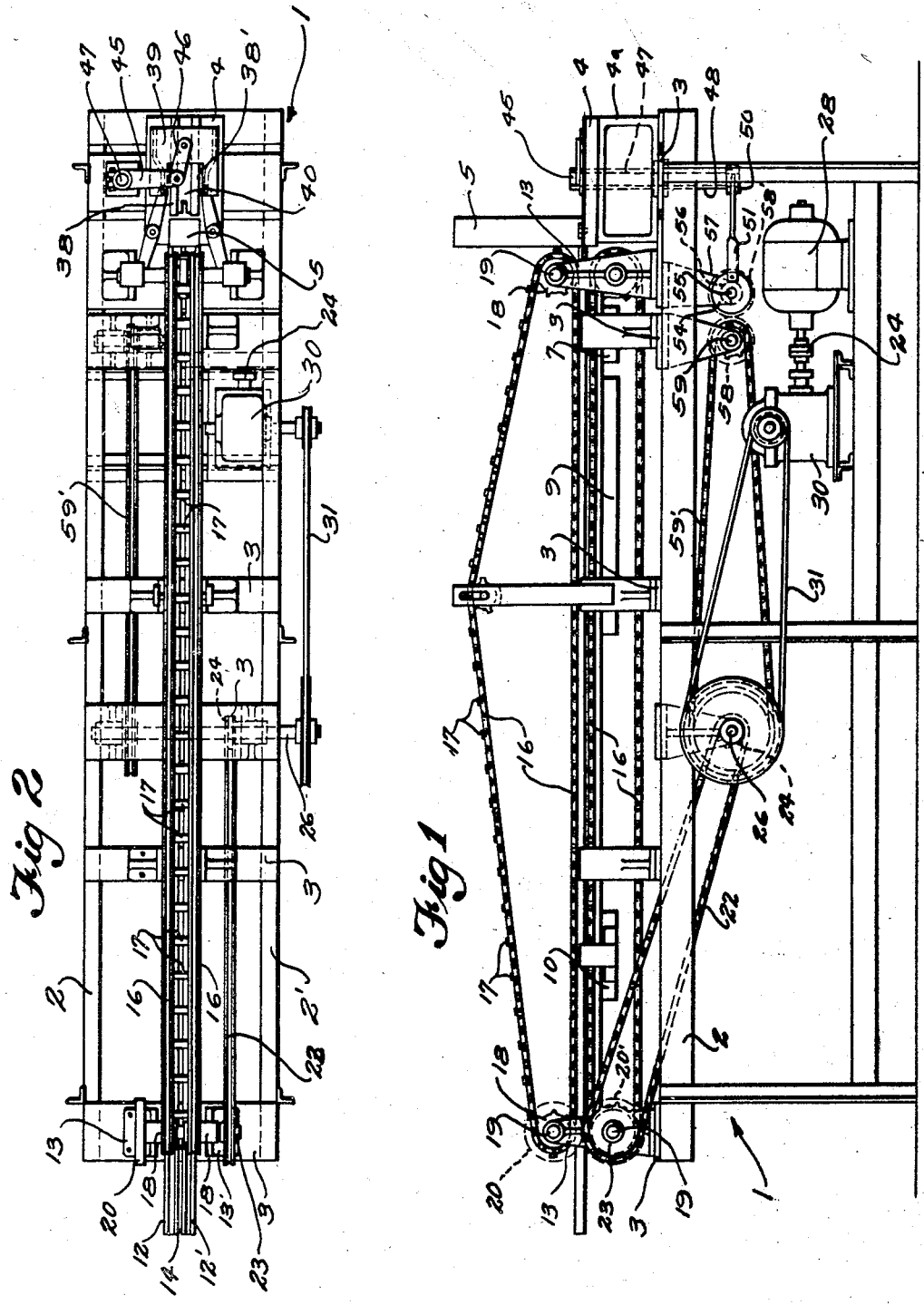

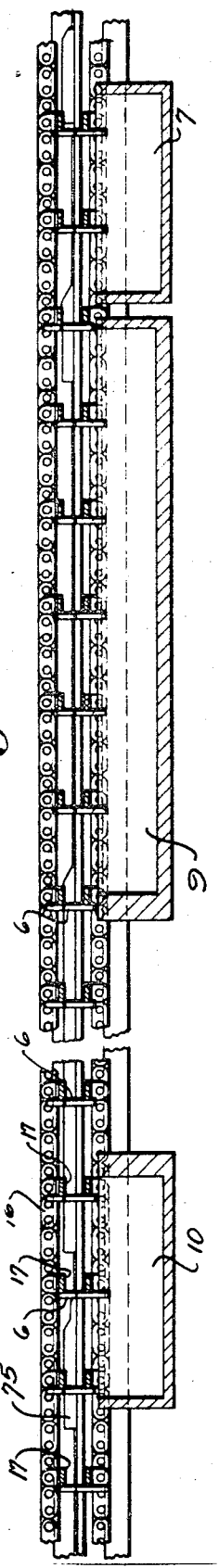

2,244,236

UNITED STATES PATENT OFFICE 2,244,236

METHOD OF SOLDER TIPPING KEYS

George A. Bardet and George V. Bardet, Berkeley, Calif., assignors to M. J. B. Company, San Francisco, Calif., a corporation of Delaware Application November 1, 1937, Serial No. 172,220

1 Claim. (Cl. 91—70.2)

This invention relates to a method of and an improved means for solder tipping keys such as those which are used for the removal of the tearing strips from metal cans and containers; the tipping of the keys with a solder bead or lug being for the purpose of providing a means whereby the keys subsequently may be affixed to the cans, thus to insure that when it is desired to open a can, a key will be available for that purpose merely by breaking it loose from the can wall.

It is the principal object of this invention to improve upon that method of key tipping or dipping that is disclosed in the patent of G. A. Bardet et al., issued January 20, 1931, No. 1,789,722, and also to improve upon the machine of that patent in a certain feature whereby the solder lug is prevented from being drawn out beyond the end of the key shank.

Explanatory to the present invention, it will here be stated that it is now a practise quite generally followed to attach the tearing strip keys to cans by applying a small lug of solder to the ends of the keys, then to place the keys upon the end wall of the cans and to apply an electrode of an electric circuit against the solder tipped part of the keys whereby to cause the solder to be melted; it being understand that, upon removal of the electrode, the solder will set and thereby solder the key to the can wall.

Keys of this kind are, as a rule, formed from steel wire. Sometimes the keys are plated with a copper wash prior to solder tipping. Such plating, while it may be desirable in some instances, has no bearing on the present invention. The difficulty experienced in solder tipped keys breaking loose from the can prior to use is generally due to the fact that there is not a sufficient bond formed between the key shank and the solder, and this is because the key shank, at the time of tipping it with solder, is not brought up to a temperature sufficient to cause a connection by penetration of solder into the key metal, but since the key is dipped while relatively cold, the solder merely forms a coating without any permanent bond. Therefore, this invention is directed to a method of effecting a holding bond between the key shank and the solder lug, and to insure a solder lug of a necessary size, that when the key is once attached to the can, it can not be broken loose except by an application of the intended amount of pressure or pull on it.

It is a further object of the invention to improve upon certain details of construction of the key dipping machine of the prior patent so that when the tip of the key is lifted from the solder bath, the lug adhering thereto will not be drawn out to an elongated point but will be wiped off flush with or adjacent the end of the key.

More specifically, the present method resides in effecting a better adherence of the solder lug by reason of a first and second dipping operation in which the first is of relatively long duration and in a hotter mixture to insure heating of the key to a degree at which the solder will fuse with the key metal to form a permanent bond, as differentiated from a coating, and wherein the second dip is relatively short and in a mixture of lower temperature to cause the adherence of a greater amount.

Other objects of the invention reside in the details of construction of the machine, in the combination of parts, and in their mode of operation, as will hereinafter be fully described.

In accomplishing these and other objects of the invention, we have provided the improved details of construction, the preferred forms of which are illustrated in the accompanying drawings, wherein—

Fig. 1 is a side view of a key dipping machine embodied by the present invention.

Fig. 2 is a plan view of the same.

Fig. 3 is an enlarged sectional detail longitudinally of the key guideway and conveyers whereby the keys are advanced through the various dipping operations.

Fig. 4 is a sectional detail of the key magazine and key feeding mechanism of the machine.

Fig. 5 is a plan view of the key feed slide.

Fig. 6 is an enlarged view of the key lifting cam.

Fig. 7 is an enlarged cross section of a processed key.

Referring more in detail to the drawings—

The present machine comprises a main frame structure designated in its entirety by reference numeral 1, including spaced longitudinal bars 2 and 2', disposed in the same horizontal plane and joined together at spaced intervals by cross frames 3. Upon one end of the main frame 1 is a key feed table 4, supported by frames 4a and erected upon the feed table at its forward edge is a vertical magazine 5 provided with a passage 5a within which the keys 6 to be dipped are stacked, in such manner that the stack will feed downwardly in accordance with the successive discharge of keys therefrom at the lower end of the magazine.

Supported by one of the cross frame members 3 of the main frame structure 1, just forwardly of the table 4, is open top container 7 which contains a soldering flux, and in alinement with this flux container is a rather elongated container 9 wherein tinning solder is kept in a molten state at approximately 480° F. At some distance spaced from the solder pot 9, and also in alinement therewith, is a second solder pot 10 of relatively short length in which a second dip of tinning solder is contained; this being kept at a temperature of approximately 460° F.

Extending from the feed table 4 directly over the flux and solder containers is a key track and guideway that is formed by two plates 12 and 12'. These are disposed in the same horizontal plane and are slightly spaced. At their ends, they are fixed to parts of the main frame and are held rigid. These plates are arranged with their adjacent edges in spaced relation whereby to provide an intermediate slot 14 from end to end of the guideway for the travel of keys therein. At the receiving end, the slot terminates in alinement and registration with a discharge slot 5a provided in the lower end of the key supplying magazine 5, and it is of such width that the shank portions only of the keys may drop therethrough, and the keys will be held suspended by the loop ends as they are moved along the guideway successively over the containers 7, 9 and 10. Provision is also made to so suspend the keys that, in their travel, their lower end portions will be dipped first in the soldering flux of container 7, then in the solder of high temperature in container 9, and finally, after passing through a cooling interval, to be dipped in the solder of low temperature contained in pot 10.

The means herein provided for advancing the keys along the guideway comprises paired chain conveyor belts 16 which operate together, and in parallel relation at opposite sides of the slot both above and below the plates 12 and 12'. Cross bars 17 extend between the two belts above and the two belts below the guideways for engaging the keys in such manner as to push them along the slot. As here illustrated, the conveyer belts are carried by sprocket wheels 18 on cross shafts 19 extended between transversely alined standards 13. The movement of the four belts is synchronized through intermeshing gears 20 and 20' that are fixed to the ends of shafts 19 for upper and lower belts and they are driven by a sprocket wheel 23 fixed on a shaft 19 and also about a sprocket 24 fixed on a driven shaft 26. In the present instance an electric motor 28 is provided as the driving means, and this has its shaft 29 connected through a gear reduction mechanism 30 and belt 31 with the shaft 26.

Located centrally on the table top 4 in the longitudinal direction of the machine are parallel guides 38—38' and reciprocally contained between these is a feed block 39 to which one end of a key feed slide 40 is fixed. The forward end of the feed slide is adapted, on each forward movement of the block, to engage and push the lower key of the stack from the magazine and into a position at which it will be taken up and advanced through the machine by the cross bars of the synchronized conveyer belts. The slide is reciprocally actuated by a lever 45 to which it is pivotally connected through the mediacy of a link 46. The lever 45 is fixed horizontally to the upper end of a rocker shaft 47 carried on a vertical sleeve 48 fixed to the main frame structure. At its lower end, the shaft 47 has a lever arm 50 fixed thereto and this is connected at its end to a link 51 which, in turn, is connected pivotally and eccentrically to a wheel 54 on the end of a cross shaft 55 revolubly mounted in bearings 56 in the lower ends of brackets 57 that are fixed to the under side of the frame structure. The shaft 55 is driven by intermeshing gears 58 and 58' on the shafts 55 and 59; the shaft 59 being driven by a belt chain 59' from shaft 26 to shaft 59, and rotation of shaft 55 causes the wheel 54 and link 51 to impart motion to the shaft 47 and lever 45, which in turn, causes reciprocal action of the feed slide to deliver the keys, one at a time, into the guideway.

The keys are so positioned in the magazine that they will be pushed out with the looped end forward, whereupon the shank portion will fall of its own weight downwardly through the slot 14 and will be held in a suspended position by the key loop. When the feed slide is retracted, the shank portion of the lower key in the supply magazine drops into the slot 50; then, as the slide is advanced, its forward end portions at opposite sides of the slot, engage with the loop of the key and cause the key to be pushed from the magazine into the guideway. As the keys are thus advanced into the guideway, they are successively picked up by the cross bars of the conveyer chains and are advanced along the guideway and across the flux and solder pots as previously stated.

In order that the depending lower end portions of the keys may be dipped in the flux and solder, yet not come into engagement with the end walls of the flux and solder pots, provision is made for lifting the keys at the proper intervals. The means for effecting this lifting comprises cam lugs 60 located on the plates 12—12' in the same transverse planes of these walls of the flux and solder pots, and across which lugs the supporting loops of the keys are caused to ride as the keys are advanced. These cam lugs are just of sufficient height that, in passing thereover, the lower ends of the keys will be carried clear of the top edge of the end walls of the pots. Immediately after a key has been carried across the end wall of the flux or solder pot, it is lowered so that its tip end will be dipped to proper extent. It will be understood that in tipping a key end, the end is first carried through the flux pot 7 to immerse the part of the key to be tipped; then it is likewise carried through the first solder dip for fusing the plating with the key metal, and also fusing a base coat of solder to the key.

A feature of the present invention resides in the fact that the first solder pot is of considerable length and the solder therein is maintained at a relatively high temperature. This provides that the key will remain in the solder for a relatively long interval of time during which the key becomes thoroughly heated and the solder penetrates the metal and forms a permanent bond therewith. Then the keys are cooled by being carried through the interval between the first and second solder pots 9 and 10. A water cooling vat may be interposed here if necessary. The keys are finally carried through the second solder dip which is of relatively short duration, and it is only necessary that they be momentarily dipped because this solder quickly and readily adheres to the base coat. Furthermore, by having the solder of the second dip at a lower degree of temperature, a lug of substantial and adequate size will adhere to the key.

As a feature of the invention, provision is herein made that this lug of solder will not be drawn out to a long tip when the key is lifted. To accomplish this, I have provided cams 75 on the plates 12—12' at opposite sides of the slot for first just slightly elevating the key while it is still passing through the second solder pot so that its lower end is just even with the top surface of the solder, and whereby the ball of solder will be wiped off by solder in the pot even with the lower end of the key. The key is then lifted over the end of the pot and carried through a certain cooling interval so that the keys, as they are delivered from the machine, will not adhere to each other.

The features of this invention reside, first, in applying a dip of solder, as at A in Fig. 7, that is of relatively high temperature and retaining the key therein through a considerable period of time so that the solder coat will penetrate and be thoroughly united with the key metal, and finally dipping the key in a solder of lower temperature for causing the formation of a ball or knob of solder at the key end as at B in Fig. 7.

The feature of improvement in the machine resides in the provision of the key lifting cam associated with the second dip, which lifts the key just sufficient that the lower tip will wipe the top surface of the solder, thus to wipe off that part of the solder ball that otherwise would be drawn out to a point extending from the key end.

After the keys are thus solder tipped, it is desirable that they be tinned in order to prevent corrosion. This would be done in the usual way so that the entire key and solder lug is coated.

Having thus described our invention, what we claim as new therein and desire to secure by Letters Patent is—

The method of solder tipping keys which comprises first applying a soldering flux to the key end, then inserting the end of the key shank vertically into molten solder of relatively high temperature, and maintaining it there for a period sufficient to heat the key shank to approximately the temperature of the solder, and to cause it to be coated with the solder, then cooling, and finally inserting the coated part of the key shank momentarily in molten solder of a lower temperature just slightly above its melting point, withdrawing the shank and wiping off the lower end of the bead by moving the key while held vertically across the top of the molten solder.

GEORGE A. BARDET.
GEORGE V. BARDET.